(12) United States Patent
Lim

(10) Patent No.: US 6,801,275 B2
(45) Date of Patent: Oct. 5, 2004

(54) TFT-LCD DEVICE COMPRISING TEST PIXELS, BLACK MATRIX ELEMENTS, COMMON VOLTAGE LINE FORMED WITHIN A PARTICULAR DUMMY REGION

(75) Inventor: Joo Soo Lim, Gyeongsangbuk-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/724,893

(22) Filed: Dec. 2, 2003

(65) Prior Publication Data

US 2004/0119917 A1 Jun. 24, 2004

(30) Foreign Application Priority Data

Dec. 18, 2002 (KR) ................................ 10-2002-0081460

(51) Int. Cl.$^7$ .......................................... G02L 1/1333
(52) U.S. Cl. ........................................ 349/110; 349/54
(58) Field of Search ........................... 349/54, 110, 111, 349/192

(56) References Cited

U.S. PATENT DOCUMENTS 5,285,301 A * 2/1994 Shirahashi et al. ......... 349/143
6,577,367 B2 * 6/2003 Kim .......................... 349/139
2002/0063834 A1 * 5/2002 Sawasaki et al. .......... 349/130

FOREIGN PATENT DOCUMENTS

JP          2001-42357      * 2/2001

* cited by examiner

Primary Examiner—Toan Ton
(74) Attorney, Agent, or Firm—Morgan, Lewis & Bockius LLP

(57) ABSTRACT

A liquid crystal display device includes a first substrate divided into a first active region and a first dummy region surrounding the first active region, a plurality of data lines and gate lines arranged on the first substrate along lengthwise and widthwise directions to define a plurality of pixel regions, a common voltage line formed within the first dummy region, a plurality of active pixels formed within the first active region each having a pixel electrode, a plurality of test pixels formed within the first dummy region each having a pixel electrode, a second substrate divided into a second active region and a second dummy region surrounding the second active region and bonded to the first substrate, a first black matrix formed within the second dummy region having openings corresponding to the test pixels, a second black matrix formed within the second dummy region to overlap the pixel electrodes of the test pixels by a plurality of different widths, and a common electrode formed on the second substrate including the first black matrix and the second black matrix, wherein the common electrode receives a common voltage from a common voltage line.

6 Claims, 5 Drawing Sheets

TFT-LCD DEVICE COMPRISING TEST PIXELS, BLACK MATRIX ELEMENTS, COMMON VOLTAGE LINE FORMED WITHIN A PARTICULAR DUMMY REGION

The present invention claims the benefit of Korean Patent Application No. 81460/2002 filed in Korea on Dec. 18, 2002, which is hereby incorporated by reference.

BACKGROUND OF THE INVENTION

1. Field of the Invention

The present invention relates to a liquid crystal display device, and more particularly, to a liquid crystal display device including a test pixel for detecting light leakage and a method of fabricating a black matrix using the test pixel.

2. Description of the Background Art

As visual display devices become increasingly important as visual information transmitting media, the display devices must have low power consumption, high image quality, light weight, and a thin profile. Currently, liquid crystal display (LCD) devices are employed in flat panel displays (FPDs) due to their simplicity of fabrication, and are rapidly replacing cathode ray tube (CRT) devices.

The LCD devices include a first substrate to function as an array substrate, a second substrate to function as a color filter substrate, and a liquid crystal layer formed between the first and second substrates. Pixel electrodes and a common electrode are formed as transparent conducting layers on the array substrate and the color filter substrate, respectively, in order to induce an electric field to the liquid crystal layer. In addition, aligning layers are formed on the pairs of pixel and common electrodes.

Liquid crystal molecules of the liquid crystal layer are initially aligned along a specific direction using the aligning layers and a rubbing process. Within specific regions, the liquid crystal molecules are either uniformly aligned or are varied continuously. In order to provide an optimum display state, an entire liquid crystal cell must be disposed within a single region.

A boundary between two adjacent regions in which alignment of the liquid crystal molecules are varied discontinuously is commonly called a regional barrier. At the regional barrier, disclination phenomenon occurs in which the alignment of the liquid crystal molecules is varied discontinuously. In particular, in a liquid crystal display device having many of conductive lines (i.e., gate lines, data lines, storage capacity electrode lines, etc.) formed, horizontal and vertical electric fields are generated between the conductive lines. Thus, the horizontal electric field is a main contributing factor for generating the disclination phenomenon. As a result of the disclination phenomenon, light may leak from edges of the pixel electrode, thereby lowering contrast ratios due to the light leakage.

FIG. 1 is a plan view of a liquid crystal display device demonstrating the light leakage phenomenon according to the related art. In FIG. 1, a portion within a pixel 110 marked with oblique lines indicates a light leakage region. Accordingly, since it is impossible to adjust alignment of liquid crystal molecules within a disclination phenomenon occurring region, the region has to be covered with a black matrix 100. In addition, if the black matrix 100 is not precisely designed, the light leakage portion inevitably occurs within a region where the black matrix 100 does not exist. Accordingly, the disclination phenomenon acts as a very important factor in determining intervals between adjacent conductive lines of the liquid crystal display device and designing of the black matrix 100.

In order to determine optimum intervals between the conductive lines and an optimum width of the black matrix, consideration of a bonding margin of the array substrate and the color filter substrate, misalignment of the black matrix, and stepped regions of thin film transistors (TFTs) must be given. In addition, under a microscope having high magnification, the disclination phenomenon can be calculated. Then, by applying the result to a mask, the light phenomenon can be resolved by designing the liquid crystal display panel through repeated trial and error processes. However, the liquid crystal display device has to be disassembled and observed in order to get an accurate result. Moreover, it is still impossible to obtain accurate information about the disclination phenomenon.

SUMMARY OF THE INVENTION

Accordingly, the present invention is directed to a liquid crystal display device including a test pixel for detecting light leakage and a method of fabricating a black matrix using a test pixel that substantially obviates one or more of the problems due to limitations and disadvantages of the related art.

An object of the present invention is to provide a liquid crystal display device having a test pixel for detecting light leakage.

Another object of the present invention is to provide a method for fabricating a black matrix using a test pixel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate divided into a first active region and a first dummy region surrounding the first active region, a plurality of data lines and gate lines arranged on the first substrate along lengthwise and widthwise directions to define a plurality of pixel regions, a common voltage line formed within the first dummy region, a plurality of active pixels formed within the first active region each having a pixel electrode, a plurality of test pixels formed within the first dummy region each having a pixel electrode, a second substrate divided into a second active region and a second dummy region surrounding the second active region and bonded to the first substrate, a first black matrix formed within the second dummy region having openings corresponding to the test pixels, a second black matrix formed within the second dummy region to overlap the pixel electrodes of the test pixels by a plurality of different widths, and a common electrode formed on the second substrate including the first black matrix and the second black matrix, wherein the common electrode receives a common voltage from a common voltage line.

In another aspect, a method for fabricating a black matrix includes providing a liquid crystal display device divided into an active region and a dummy region, observing a plurality of test pixels formed within the dummy region by varying widths of a black matrix, determining a minimum width of the black matrix not showing a light leakage phenomenon, and fabricating a mask for fabricating the black matrix having the minimum width.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the exemplary embodiments of the present invention, examples of which are illustrated in the accompanying drawings.

Figure 1:
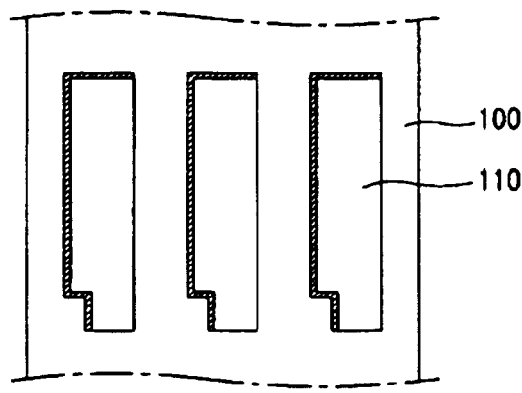
FIG. 1 is a plan view of a liquid crystal display device demonstrating the light leakage phenomenon according to the related art.
Figure 2:
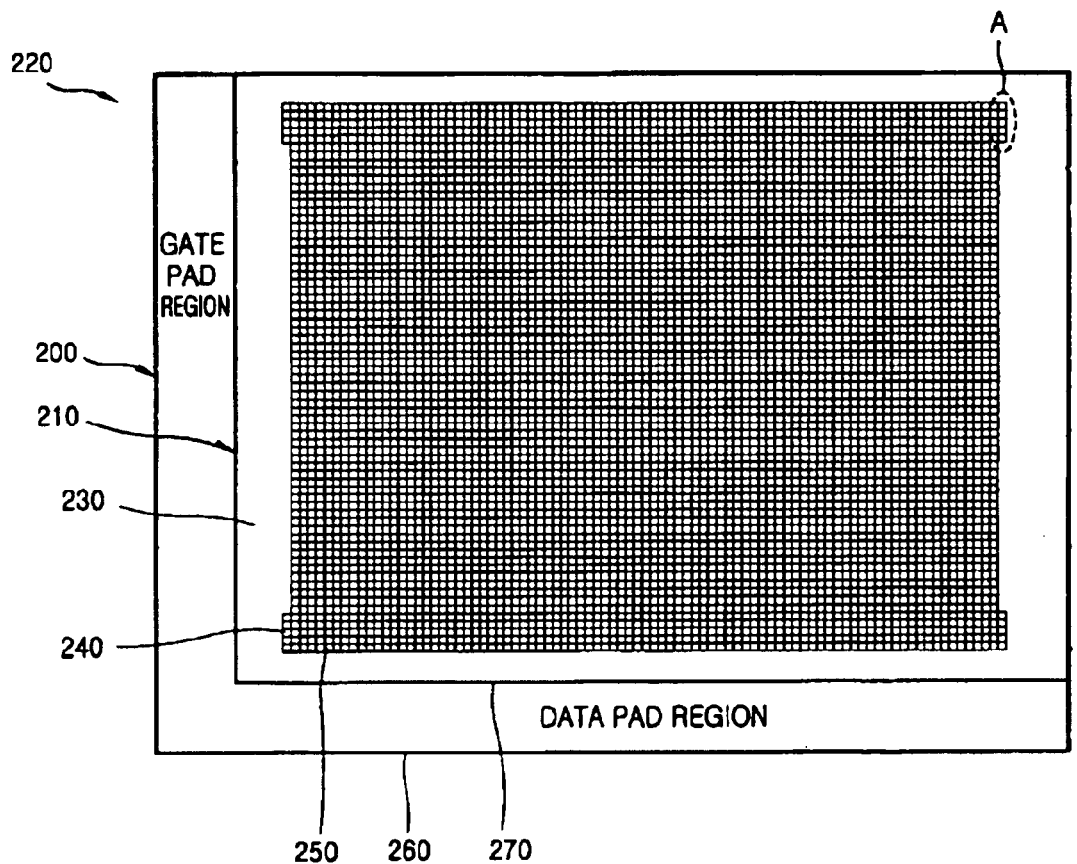
FIG. 2 is a plan view of an exemplary liquid crystal display panel according to the present invention.

FIG. 2 is a plan view of an exemplary liquid crystal display panel according to the present invention. In FIG. 2, a liquid crystal display panel 220 may include an array substrate 260 as a first substrate and a color filter substrate 270 as a second substrate. The array substrate 260 may be divided into a first active region and a first dummy region surrounding the first active region, a plurality of active pixels 250 formed within the first active region to have pixel electrodes, and a plurality of test pixels 240 formed within the first dummy region to have pixel electrodes. The color filter substrate 270 may be divided into a second active region and a second dummy region surrounding the second active region and may be bonded to the first substrate 260. In addition, the color filter substrate 270 may include a first black matrix 230 formed in the second dummy region to have a plurality of openings A that correspond to the test pixels 240 and a second black matrix formed in the second dummy region and overlapping the pixel electrodes of the test pixels 240 by varying widths.

The first active region and the second active region may denote regions in which an actual image is displayed, and the first dummy region and the second dummy region may denote the outline of the first and second active regions. In addition, the plurality of active pixels 250 may denote a plurality of pixels formed in the actual image display region.

The array substrate 200 may include at least two types of metal layers, an insulating layer, an amorphous silicon layer, and a transparent electrode deposited onto the first substrate 260 as one of a thin film, a processed-fabricated thin film transistor, a storage capacitor and a pixel electrode. In addition, the test and active pixels 240 and 250 may be arranged in a matrix configuration and may be connected to each other by gate and data lines, and a gate pad (not shown) and a data pad (not shown) for supplying operational signals from a driver integrated circuit that may be disposed at the end of each of the gate and data lines. The gate pad may be formed within a gate pad region, and the data pad may be formed within a data pad region. Although not shown, a common voltage line may be formed around the array substrate 200 in order to supply a common voltage ($V_{com}$).

The color filter substrate 210 may be fabricated using separate fabrication processes different from the fabrication processes for the array substrate 200. For example, a black matrix for preventing light transmission between adjacent pixels and red (R), green (G), and blue (B) color filters may be formed on a transparent substrate made of the same material as the array substrate 200. An indium tin oxide (ITO) thin film used as a common electrode may be deposited along an entire surface of the color filter substrate 210 and may receive the common voltage ($V_{com}$) from the common voltage line through a silver (Ag) dot.

Aligning layers for aligning liquid crystal particles on each surface along a certain direction may be formed on the array and color filter substrates 200 and 210. In addition, the array and color filter substrates 200 and 210 may be bonded together using a sealant after formation of spacers between the array and color filter substrates 200 and 210. Then, a liquid crystal material may be injected in a gap created by the spacers between the array and color filter substrates 200 and 210.

The first black matrix 230 may be formed along edges of the color filter substrate 210 in order to cover a non-display region where the common voltage line and sealant are formed. A portion of the dummy pixels formed on the array substrate 200 that corresponds to the first black matrix 230 may include the test pixel 240 exposed through the opening A formed on the first black matrix 230. For example, five test pixels 240 may be sequentially arranged within the first dummy region abutting on the four corners of the first active region and may be exposed through the opening A.

Figure 3A:
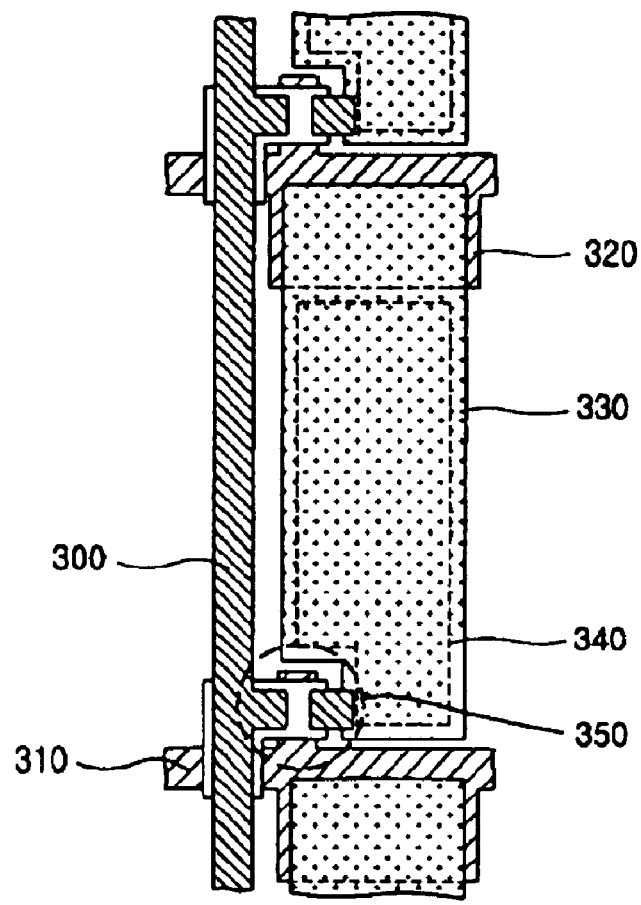
FIG. 3A is a plan view of an exemplary array substrate of the liquid crystal display panel of FIG. 2 according to the present invention.
Figure 3B:
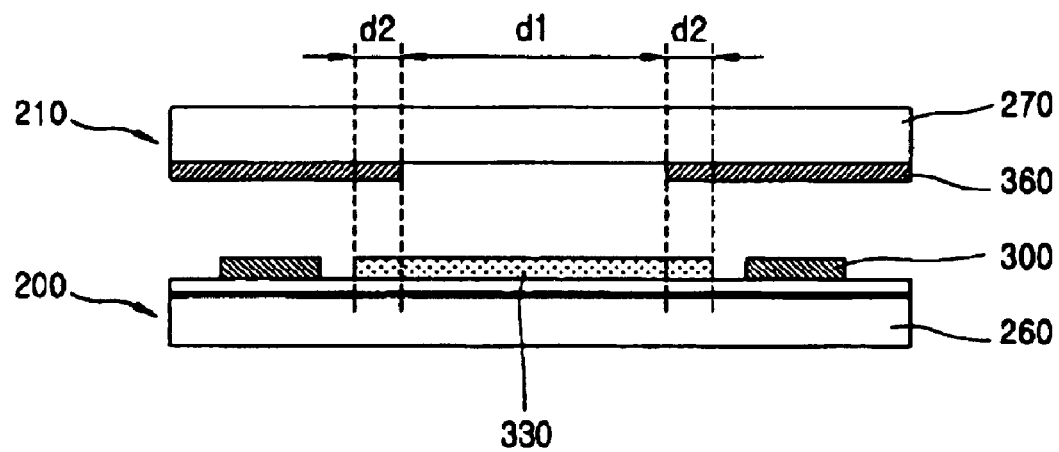
FIG. 3B is a cross sectional view of an exemplary pixel of the liquid crystal display panel of FIG. 2 according to the present invention.

FIG. 3A is a plan view of an exemplary array substrate of the liquid crystal display panel of FIG. 2 according to the present invention, and FIG. 3B is a cross sectional view of an exemplary pixel of the liquid crystal display panel of FIG. 2 according to the present invention. In FIGS. 3A and 3B, the data line 310 and the gate line 300 may be arranged along lengthwise and widthwise directions on the array substrate 200 in order to define a plurality of pixel regions, and the thin film transistor 350, which may function as a switching device, may be formed at crossing regions of the data line 310 and the gate line 300. In addition, the pixel electrode 330 may be formed to be electrically connected to the drain electrode of the thin film transistor 350.

The storage capacitor may be connected in parallel to a liquid crystal capacitor ($C_{lc}$) in order to assist in maintaining a voltage supplied to the liquid crystal layer during a one frame cycle. One of a storage-on-common (SOC) method and storage-on-gate (SOG) method may be used for installing the storage capacitor. In both of the two methods, a total load capacity ($C_t$) of the thin film transistor may be equal to a sum total of a liquid crystal capacity and a storage capacity. Although shown in FIGS. 3A and 3B, a storage capacitor using the storage-on gate-method may be formed, it may also be possible to use other methods.

The data line 300, the gate line 310, and the color filter substrate 210 corresponding to the edges 340 of the pixel electrode 330 may be formed on the thin film transistor 350. In addition, the second black matrix 360 may be formed to optically separate each pixel and shield light transmitting through a non-controlled liquid crystal layer in order to improve a contrast ratio of the device.

In determining an aperture ratio, portions including the thin film transistor 350, the data line 300, the gate line 310, and the storage capacitor electrode 320 may prevent transmission of back light through non-transparent metal layers. Accordingly, a size of the opening d1 of the second black matrix 360 may be determined based on an aligning error between the array substrate 200 and the color filter substrate 210. Thus, it may be possible to improve an aperture ratio by minimizing areas of the portions that prevent the transmission of the light. For example, within a unit pixel design, size and arrangement of the thin film transistor 350, the data line 300, the gate line 310, the storage capacitor electrode 320, and the second black matrix 360 may be determined to have a maximum aperture ratio using an operational simulation of the unit pixel on a minimum design rule basis that is determined by photolithographic and etching process margins.

Due to an electric field created by the data line 300, an edge electric field is formed around the pixel electrode 330. Accordingly, the electric field interferes with alignment control of the liquid crystal molecules due to the liquid crystal voltage supplied to the pixel electrode 330. Thus, the region around the pixel electrode 330 may be covered by the second black matrix 360. In addition, since a bonding margin of the array substrate 200 and the color filter substrate 210 must to be included, many factors must be considered in order to make the second black matrix 360 precisely overlap the pixel electrode 330. In FIG. 3B, the pixel electrode 330 and the second black matrix 360 overlap by portions d2.

Because the aligning error of the array substrate 200 and the color filter substrate 210 may not be less than about 5 μm, in order to cover the edge electric field region around the pixel electrode 330, a portion of the second black matrix 360 overlaps with the pixel electrode 330 so as to be not less than about 5 μm.

Figure 4:
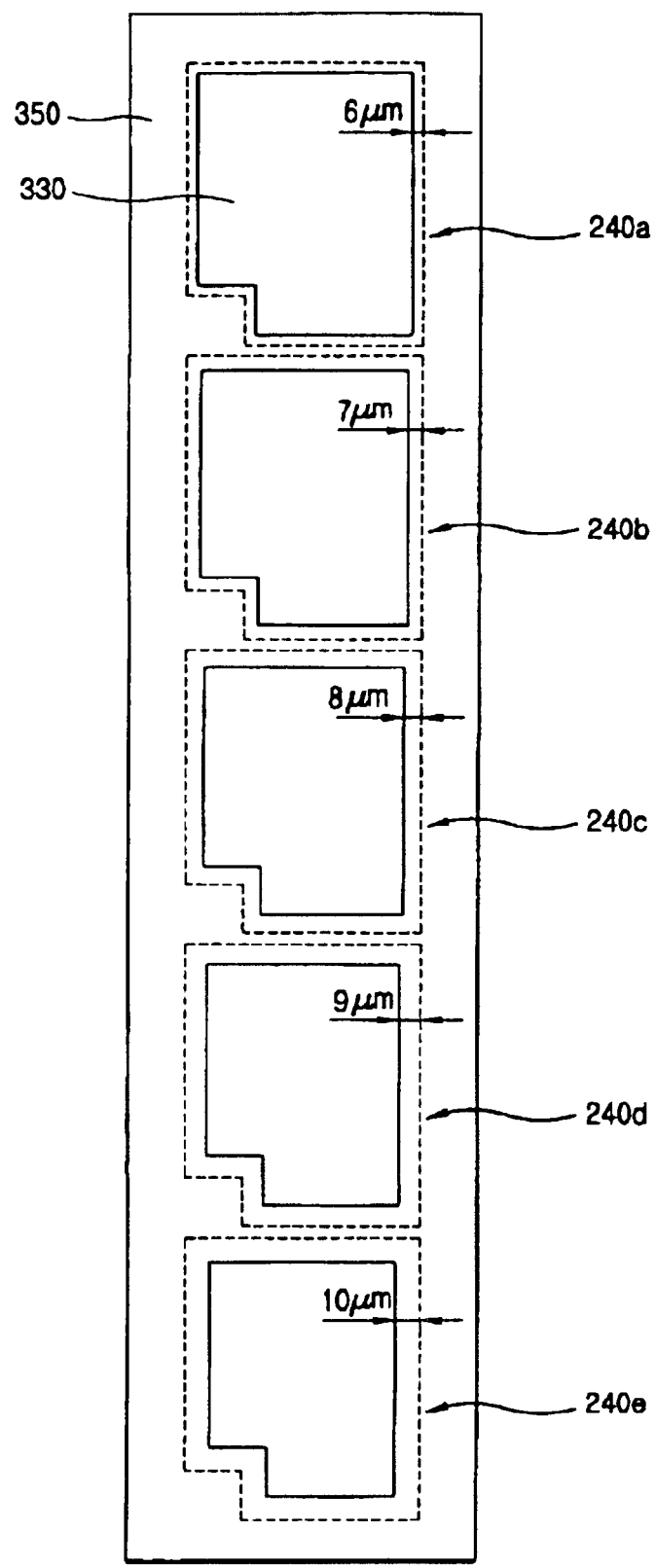
FIG. 4 is an enlarged plan view of an exemplary part A of the liquid crystal display panel in FIG. 2 according to the related art.

FIG. 4 is an enlarged plan view of an exemplary part A of the liquid crystal display panel in FIG. 2 according to the related art. In FIG. 4, portions of five test pixels 240a, 240b, 240c, 240d, and 240e may be aligned along a common edge and may be exposed through the openings of the first black matrix 230 (in FIG. 2). Each region of the second black matrix 360 overlapped with each of the five test pixels 240a, 240b, 240c, 240d, and 240e may be designed differently. For example, the second black matrix 350 may have an overlap width of about 6 μm in the first test pixel 240a, an overlap width of about 7 μm in the second test pixel 240b, an overlap width of about 8 μm in the third test pixel 240c, an overlap width of about 9 μm in the fourth test pixel 240d, and an overlap width of about 10 μm in the fifth test pixel 240e.

When a signal is supplied to the test pixel, a light leakage phenomenon according to the overlap width of the second black matrix 360 may be easily observed. For example, when the light leakage phenomenon is not observed in the third, fourth, and fifth test pixels 240c, 240d, and 240e, but is observed in the first and second test pixels 240a and 240b, by designing the second black matrix 350 to have a minimum overlap width of about 8 μm, it may be possible to fabricate a black matrix having a minimum overlap width.

Accordingly, it may be possible to measure data about the light leakage phenomenon to within about a 1 μm range. However, it may be possible to design the second black matrix 360 within a specific range.

According to the present invention, by forming openings at four corners of the color filter substrate in consideration of aligning errors of the array substrate and the color filter substrate, it may be possible to observe the light leakage phenomenon. In addition, with each test pixel formed at each corner, uniform brightness about each test pixel of the liquid crystal display panel may be measured.

Figure 5:
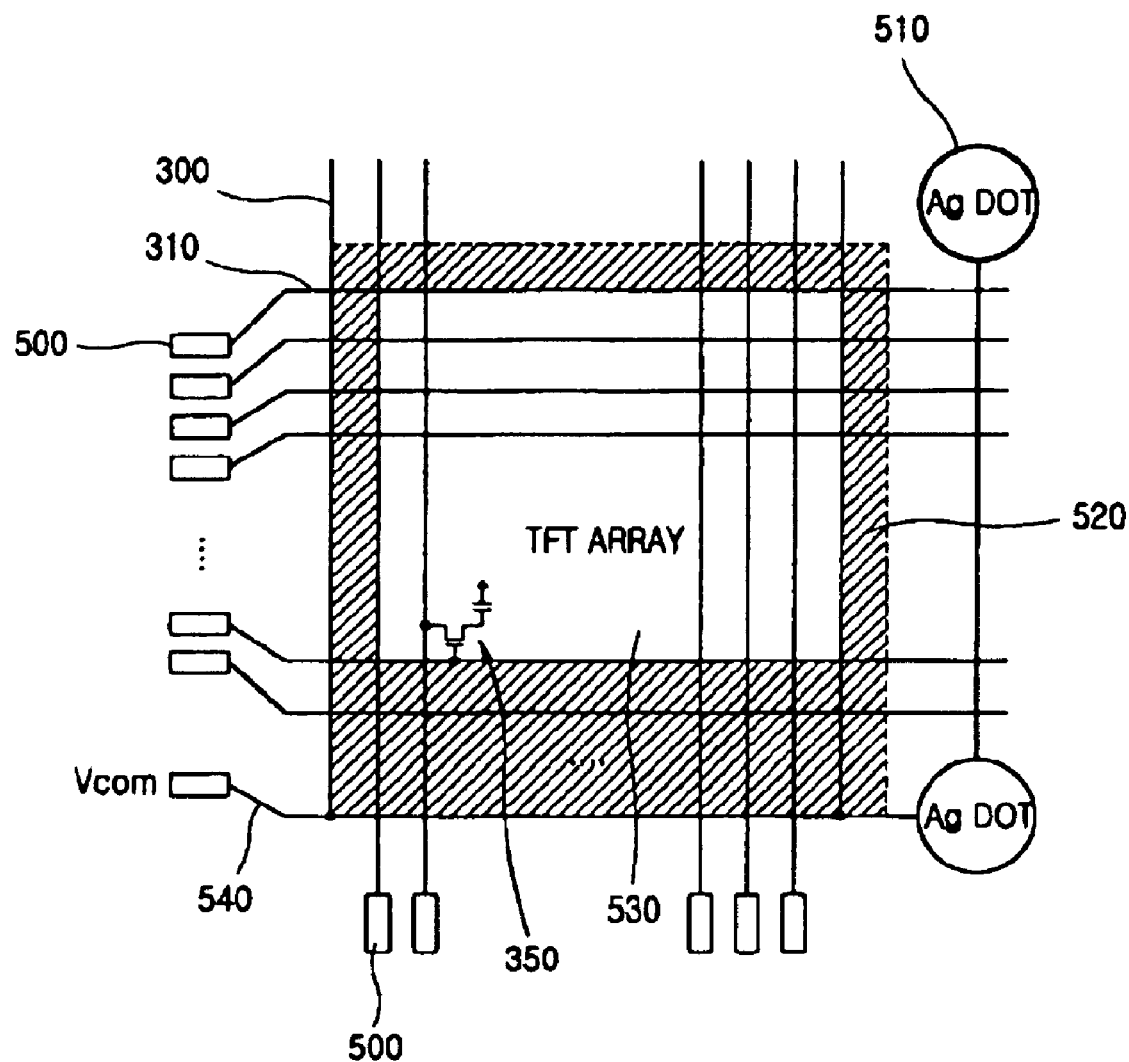
FIG. 5 is a schematic plan view of another exemplary array substrate according to the present invention.

FIG. 5 is a schematic plan view of another exemplary array substrate according to the present invention. In FIG. 5, since a common voltage line 540 may be formed along an outline boundary of a array substrate, a common voltage may be supplied to the common electrode of the color filter substrate through a silver (Ag) dot. Since a pad 500 may be formed at ends of data and gate lines 300 and 310, a signal may be supplied from a driver integrated circuit. A thin film transistor array may be divided into a first array region 530 and a first dummy region 520, shown as oblique lines in FIG. 5. In addition, an active electrode for displaying an image may be formed within the first active region 530 and a test pixel and the common voltage line 540 may be formed within the first dummy region. Accordingly, since the test pixel is formed within the first dummy region 520, a signal must be supplied to the data line 300 connected to the test pixel.

According to the present invention, in order to supply a signal to the data line 300, a common voltage may be used. Since the common voltage line 540 may be formed within the first dummy region 520, by electrically interconnecting the common voltage line 540 and the data line 300, it may be possible to supply the common voltage. Although a DC voltage may be supplied to the data line, since an electric field may be formed within an adjacent gate line, the data line, and the storage capacity electrode, a disclination phenomenon may occur and a light leakage phenomenon may be observed. Therefore, when the liquid crystal display panel is operated, the light leakage phenomenon may be easily observed.

Figure 6:
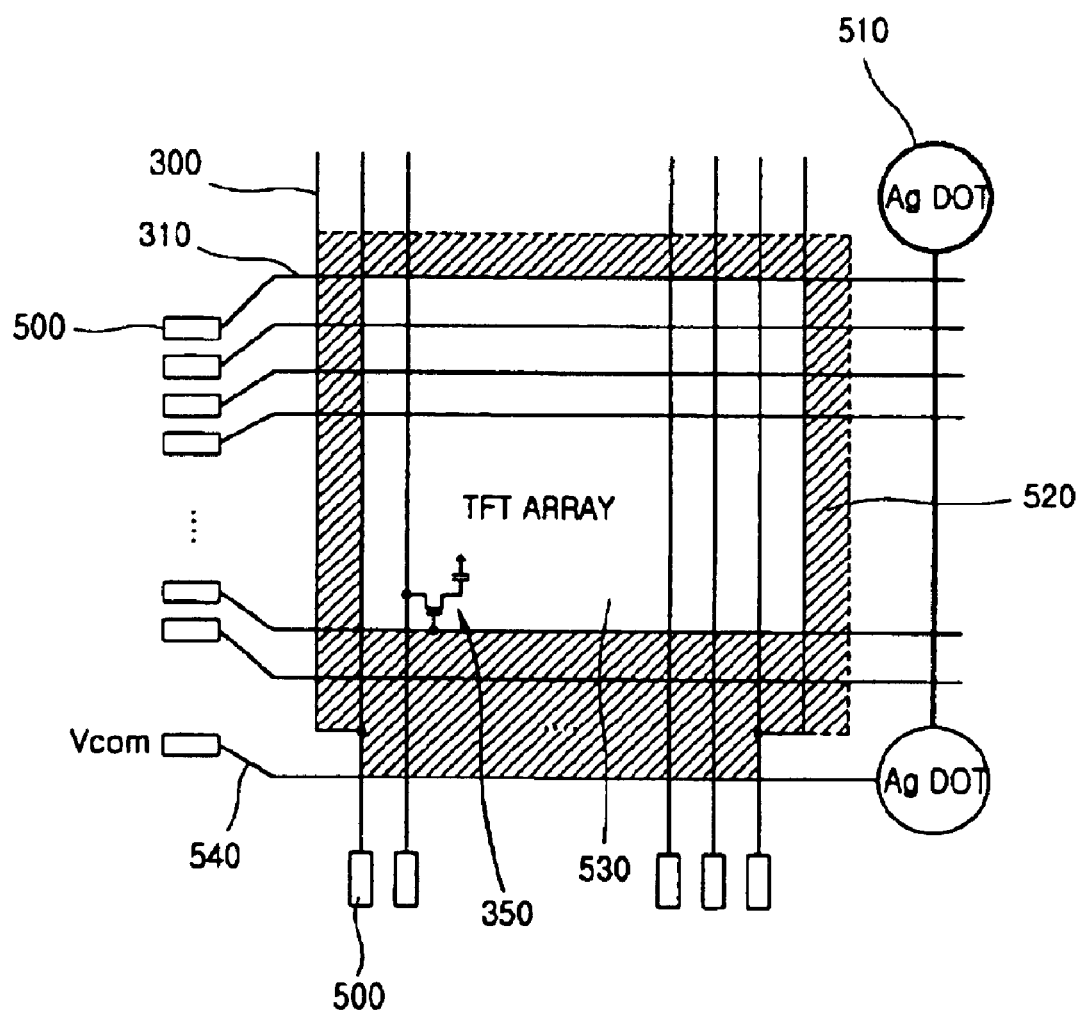
FIG. 6 is a schematic plan view of another exemplary array substrate according to the present invention.

FIG. 6 is a schematic plan view of another exemplary array substrate according to the present invention. In the liquid crystal display panel operating method according to the present invention, the same liquid crystal display panel in FIG. 5 may be used. Accordingly, explanation about specific common features in FIG. 6 may be omitted for brevity. In FIG. 6, an actual data signal may be supplied to the data line 300. For example, a signal that is the same as a data signal may be supplied to an active pixel abutting on a test pixel. By varying a pattern of a mask for forming the data line, it may be possible to electrically interconnect the data line 300 to an active pixel using the data line 300 connected to a test pixel. A laser may sever the two electrically interconnected data lines 300 after obtaining a result regarding the light leakage phenomenon. Accordingly, it may be possible to prevent a data signal from being supplied to the test pixel.

According to the present invention, it may be possible to design a mask having an optimum pattern by obtaining accurate information about the light leakage phenomenon of the liquid crystal display panel due to the disclination phenomenon. In addition, since the test pixel may be formed within the dummy region of the liquid crystal display panel, the present invention may be easily implemented by only varying a mask pattern corresponding to the dummy region, whereby minor additional expenses may be required.

It will be apparent to those skilled in the art that various modifications and variations can be made in the liquid crystal display device including test pixel for detecting light leakage and method of fabricating a black matrix using the test pixel of the present invention without departing from the spirit or scope of the invention. Thus, it is intended that the present inventions cover the modifications and variations of this invention provided they come within the scope of the appended claims and their equivalents.

What is claimed is:

1. A liquid crystal display device, comprising:
   a first substrate divided into a first active region and a first dummy region surrounding the first active region;
   a plurality of data lines and gate lines arranged on the first substrate along lengthwise and widthwise directions to define a plurality of pixel regions;
   a common voltage line formed within the first dummy region;
   a plurality of active pixels formed within the first active region each having a pixel electrode;
   a plurality of test pixels formed within the first dummy region each having a pixel electrode;
   a second substrate divided into a second active region and a second dummy region surrounding the second active region and bonded to the first substrate;
   a first black matrix formed within the second dummy region having openings corresponding to the test pixels;
   a second black matrix formed within the second dummy region to overlap the pixel electrodes of the test pixels by a plurality of different widths; and
   a common electrode formed on the second substrate including the first black matrix and the second black matrix,
   wherein the common electrode receives a common voltage from a common voltage line.

2. The device according to claim 1, wherein the plurality of test pixels are sequentially arranged in a descending order of the plurality of different widths.

3. The device according to claim 1, wherein the test pixels are formed within the first dummy region at four corners of the first active region.

4. The device according to claim 1, wherein the second black matrix is formed having varying widths at interval of about 1 $\mu$m.

5. The device according to claim 1, wherein the test pixel receives a common voltage.

6. The device according to claim 1, wherein the test pixel receives pixel data of an adjacent one of the active pixels.

* * * * *